US012649473B2

(12) United States Patent　　　(10) Patent No.:　US 12,649,473 B2
Wakamiya　　　　　　　　　　　　(45) Date of Patent:　　Jun. 9, 2026

(54) LANE CHANGE SUPPORT DEVICE

(71) Applicant: TOYOTA JIDOSHA KABUSHIKI KAISHA, Toyota (JP)

(72) Inventor: Hideyuki Wakamiya, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 18/731,586

(22) Filed: Jun. 3, 2024

(65) Prior Publication Data

US 2025/0115241 A1　　Apr. 10, 2025

(30) Foreign Application Priority Data

Oct. 4, 2023　(JP) ................................. 2023-172775

(51) Int. Cl.
　　*B60W 30/18*　　　(2012.01)
　　*B60W 30/16*　　　(2020.01)
(52) U.S. Cl.
　　CPC ...... *B60W 30/18163* (2013.01); *B60W 30/16* (2013.01); *B60W 2520/10* (2013.01); *B60W 2552/10* (2020.02); *B60W 2554/4042* (2020.02); *B60W 2554/802* (2020.02); *B60W 2720/10* (2013.01); *B60W 2720/106* (2013.01)
(58) Field of Classification Search
　　CPC ........... B60W 30/18163; B60W 30/16; B60W 2520/10; B60W 2552/10; B60W 2554/4042; B60W 2554/802; B60W 2720/10; B60W 2720/106
　　See application file for complete search history.

(56) References Cited

U.S. PATENT DOCUMENTS

| 9,809,223 | B2 * | 11/2017 | Watanabe | .............. B60W 40/06 |
| 10,793,147 | B2 | 10/2020 | Kaminade et al. | |
| 10,870,349 | B2 | 12/2020 | Uejima | |
| 10,953,883 | B2 | 3/2021 | Sakaguchi | |
| 10,981,569 | B2 | 4/2021 | Hashimoto et al. | |
| 11,014,563 | B2 | 5/2021 | Hashimoto et al. | |
| 11,072,334 | B2 | 7/2021 | Aoki et al. | |
| 11,267,473 | B2 | 3/2022 | Takahashi | |
| 11,279,360 | B2 | 3/2022 | Fukuda et al. | |

(Continued)

FOREIGN PATENT DOCUMENTS

| JP | 2021-149119 A | 9/2021 |
| JP | 2022-141356 A | 9/2022 |

*Primary Examiner* — David P. Merlino
(74) *Attorney, Agent, or Firm* — SoraIP, Inc.

(57)　　　　　　ABSTRACT

The lane change support device is configured to estimate a lane speed of another vehicle traveling on a lane of a lane change destination, determine a minimum length of a space in a lane of a lane change destination necessary for lane change based on a lane speed of the other vehicle, estimate an actual length of a space in the lane of the lane change destination, and determine whether lane change is possible based on the minimum length and the actual length, and calculate a target relative speed of the own vehicle with respect to the other vehicle based on an allowable acceleration or deceleration speed of the own vehicle, and search for a space in a lane of a lane change destination necessary for lane change while controlling a vehicle speed of the own vehicle in such a manner that a relative speed becomes a target relative speed.

11 Claims, 4 Drawing Sheets

(56)  References Cited

U.S. PATENT DOCUMENTS

| | | | |
|---|---|---|---|
| 2009/0088925 A1* | 4/2009 | Sugawara | B60W 30/12 |
| | | | 340/436 |
| 2011/0130936 A1* | 6/2011 | Noda | G08G 1/167 |
| | | | 701/70 |
| 2017/0008531 A1* | 1/2017 | Watanabe | B60W 30/18163 |
| 2017/0341652 A1* | 11/2017 | Sugawara | G08G 1/167 |
| 2017/0349173 A1* | 12/2017 | Nishiguchi | B60W 60/00 |
| 2019/0071075 A1* | 3/2019 | Mimura | G06V 20/58 |
| 2020/0070889 A1 | 3/2020 | Fukuda et al. | |
| 2020/0247400 A1 | 8/2020 | Fujii | |
| 2020/0307599 A1* | 10/2020 | Oka | B60W 60/00276 |
| 2021/0284166 A1 | 9/2021 | Oguro et al. | |
| 2022/0185289 A1* | 6/2022 | Arora | B62D 15/0255 |
| 2022/0289192 A1 | 9/2022 | Akahane | |
| 2022/0315002 A1* | 10/2022 | Kitagawa | B60W 30/18163 |

* cited by examiner

REFERENCE LENGTH Lsre

0

VEHICLE SPEED Vad OF
ANOTHER VEHICLE

MAGNITUDE Vrma OF
THE MAXIMUM
RELATIVE SPEED

0

ALLOWABLE ACCELERATION OR
DECELERATION MAGNITUDE Gxma

LANE CHANGE SUPPORT DEVICE

CROSS-REFERENCE TO RELATED APPLICATION

This application claims priority to Japanese Patent Application No. 2023-172775 filed on Oct. 4, 2023, incorporated herein by reference in its entirety.

BACKGROUND

1. Technical Field

The present disclosure relates to a lane change support device for a vehicle such as an automobile.

2. Description of Related Art

As one of the lane change support devices, there is known a lane change support device that determines whether a lane change of an own vehicle is possible, and when the lane change of the own vehicle is impossible, controls a vehicle speed of the own vehicle to search for a space for lane change in a lane of a lane change destination.

For example, Japanese Unexamined Patent Application Publication No. 2021-149119 (JP 2021-149119 A) described below describes a lane change support device that determines whether a lane change of an own vehicle is approved, and when the lane change is not approved, accelerates or decelerates the own vehicle according to a speed of another vehicle traveling in a lane of a lane change destination, and determines whether the lane change of the own vehicle is possible. According to the lane change support device of this type, it is possible to efficiently determine whether the lane change is possible as compared with a case where the own vehicle is not accelerated or decelerated.

SUMMARY

However, in the conventional lane change support device such as the device described in JP 2021-149119 A, the own vehicle is accelerated or decelerated only in accordance with the speed of the other vehicle traveling in the lane of the lane change destination without considering the urgency of the lane change. Therefore, it is impossible to preferably search for a space for lane change while controlling the speed of the own vehicle in accordance with a traveling state of the own vehicle, such as the urgency of lane change.

The present disclosure provides an improved lane change support device that is able to preferably search for a space for lane change by controlling a speed of an own vehicle in accordance with a traveling state of the own vehicle, such as the urgency of the lane change.

According to the present disclosure, there is provided a lane change support device (100) including an object target information acquiring device (18) and a control unit (driving support electronic control unit (ECU) 10).

The object target information acquiring device (18) acquires information of an object target around an own vehicle (102). The control unit (driving support ECU 10) is configured to estimate a vehicle speed (Vad) of another vehicle (112, 114) traveling in a lane (110) of a lane change destination based on the information acquired by the object target information acquiring device, determine a minimum length (Lsre) of a space in the lane of the lane change destination necessary for the own vehicle to make a lane change based on the estimated vehicle speed of the other vehicle (S10), and estimate an actual length (Ls) of a space in the lane of the lane change destination based on the information acquired by the object target information acquiring device, and perform possibility determination that determines whether the lane change of the own vehicle to the lane change destination is possible based on the minimum length and the actual length (S20).

The control unit (driving support ECU 10) is configured to, when the possibility determination is impossible (S20), set an allowable acceleration or deceleration (Gxma) of the own vehicle based on a traveling state of the own vehicle (S30), calculate a target relative speed (Vrma) of the own vehicle with respect to the other vehicle based on the allowable acceleration or deceleration (S40), and search for a space in the lane of the lane change destination necessary for the own vehicle to make a lane change while controlling a vehicle speed of the own vehicle in such a manner that a relative speed of the own vehicle with respect to the other vehicle becomes the target relative speed (S80, S100, S130, S150).

According to the above configuration, when the possibility determination is impossible, the allowable acceleration or deceleration of the own vehicle is set based on the traveling state of the own vehicle, and the target relative speed of the own vehicle with respect to the other vehicle is calculated based on the allowable acceleration or deceleration. Further, a space in the lane of the lane change destination necessary for the own vehicle to make a lane change is searched for, while the vehicle speed of the own vehicle is controlled in such a manner that the relative speed of the own vehicle with respect to the other vehicle becomes the target relative speed.

Therefore, the vehicle speed of the own vehicle can be controlled in such a manner that the relative speed of the own vehicle with respect to the other vehicle traveling in the lane of the lane change destination becomes the target relative speed calculated in accordance with the traveling state of the own vehicle. Therefore, as compared with the case where the own vehicle is accelerated or decelerated in accordance with only the speed of the other vehicle and the space is searched for, it is possible to preferably search for a space in the lane of the lane change destination necessary for the own vehicle to make a lane change.

In one aspect of the present disclosure, the control unit (driving support ECU 10) is configured to, when the vehicle speed (Vo) of the own vehicle is higher than the vehicle speed (Vad) of the other vehicle (S50) and the vehicle speed of the own vehicle is equal to or lower than a sum (Vad+Vrma) of the vehicle speed of the other vehicle and the target relative speed (S60), search for a space equal to or larger than the minimum length in the lane of the lane change destination while controlling the vehicle speed of the own vehicle in such a manner that the relative speed of the own vehicle with respect to the other vehicle becomes the target relative speed (S80).

In another aspect of the present disclosure, the control unit (driving support ECU 10) is configured to, when the vehicle speed of the own vehicle is higher than the vehicle speed of the other vehicle (S50) and the vehicle speed of the own vehicle is higher than a sum (Vad+Vrma) of the vehicle speed of the other vehicle and the target relative speed (S60), determine a realizable relative speed (Vrmaa) of the own vehicle with respect to the other vehicle, determine a correction minimum length (Lsrea) of a space in which the own vehicle is able to make a lane change based on the realizable relative speed (S90), and search for a space equal to or larger than the correction minimum length in the lane of the lane change destination while controlling the vehicle speed of the own vehicle in such a manner that the relative speed of the own vehicle with respect to the other vehicle becomes the realizable relative speed (−Vrmaa) (S100).

Further, in another aspect of the present disclosure, the control unit (driving support ECU 10) is configured to, when the vehicle speed of the own vehicle is equal to or lower than the vehicle speed of the other vehicle (S50) and the vehicle speed of the own vehicle is equal to or higher than a difference (Vad-Vrma) between the vehicle speed of the other vehicle and the target relative speed (S110), search for a space equal to or larger than the minimum length in the lane of the lane change destination while controlling the vehicle speed of the own vehicle in such a manner that the relative speed of the own vehicle with respect to the other vehicle becomes the target relative speed (S130).

Further, in another aspect of the present disclosure, the control unit (driving support ECU 10) is configured to, when the vehicle speed of the own vehicle is equal to or lower than the vehicle speed of the other vehicle (S50) and the vehicle speed of the own vehicle is lower than a difference (Vad-Vrma) between the vehicle speed of the other vehicle and the target relative speed (S110), determine a realizable relative speed (Vrmaa) of the own vehicle with respect to the other vehicle, determine a correction minimum length (Lsrea) of a space in which the own vehicle is able to make a lane change based on the realizable relative speed (S140), and search for a space equal to or larger than the correction minimum length in the lane of the lane change destination while controlling the vehicle speed of the own vehicle in such a manner that the relative speed of the own vehicle with respect to the other vehicle becomes the realizable relative speed (Vrmaa) (S150).

In the above description, other objects, features, and attendant advantages of the present disclosure will be more readily understood from the following description of an embodiment of the present disclosure with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a lane change support device according to an embodiment of the present disclosure will be described in detail with reference to the accompanying drawings.

Figure 1:
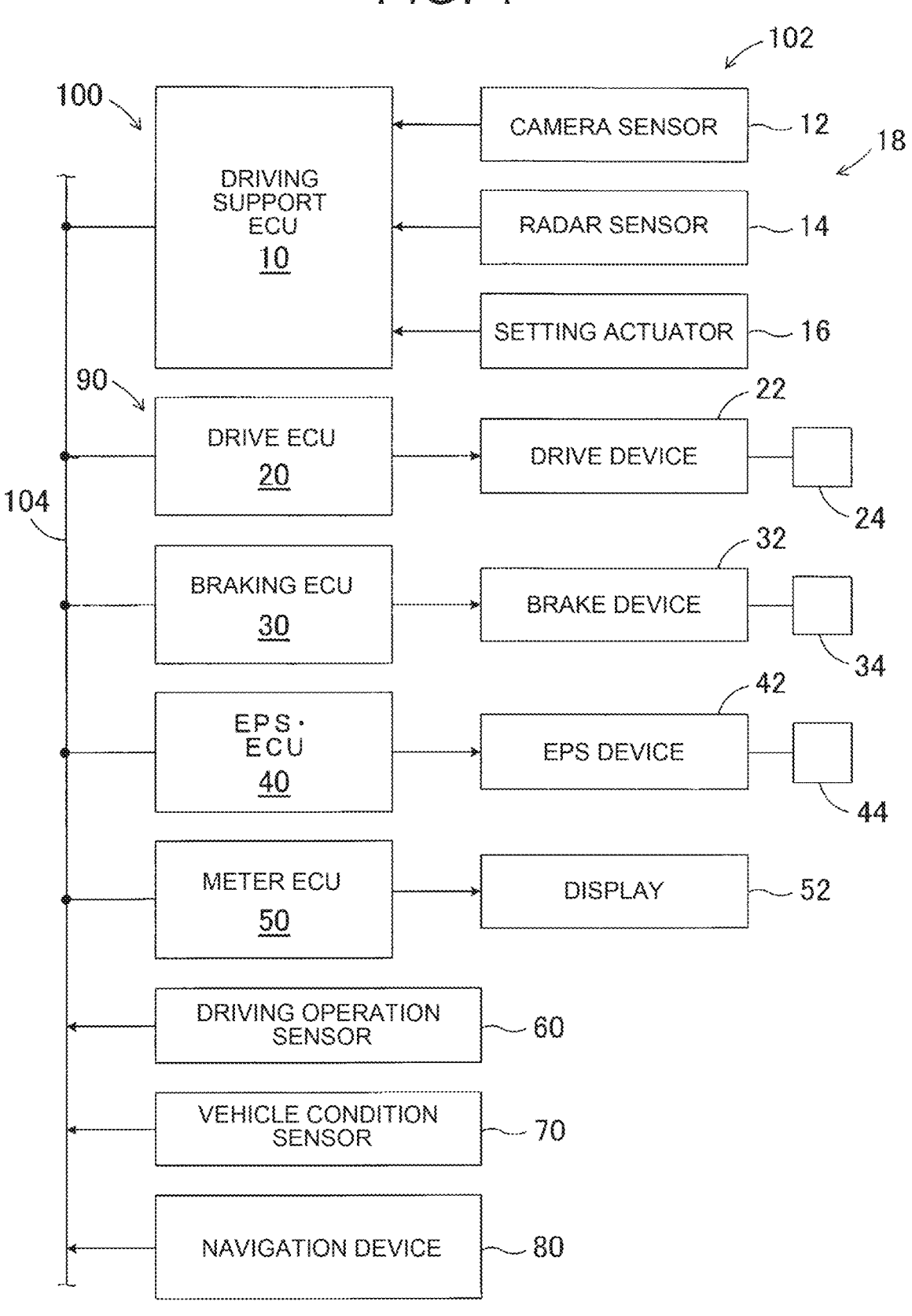
FIG. 1 is a schematic configuration diagram illustrating a lane change support device according to an embodiment.

As shown in FIG. 1, a lane change support device 100 according to an embodiment of the present disclosure is applied to vehicle 102 and includes a driving support ECU 10. The vehicle 102 is a vehicle capable of automated driving, and includes a drive ECU 20, a braking ECU 30, an electric power steering ECU 40, and a meter ECU 50. ECU means an Electronic Control Unit ECU including a microcomputer as a main part. In the following explanation, the electric power steering is referred to as an EPS.

The microcomputers of the respective ECU include Central Processing Unit (CPU), Read Only Memory (ROM), Random Access Memory (RAM), readable/writable non-volatile memories (N/M), and interfaces (I/F). The CPU realizes various functions by executing instructions (programs, routines) stored in the ROM. Further, these ECU are connected to each other in a data-exchangeable manner via a Controller Area Network (CAN) 104. Therefore, detected values of sensors (including switches) connected to a specific ECU are transmitted to other ECUs as well.

The driving support ECU 10 is a central control device that performs driving support control such as lane change support control and lane keeping control. In an embodiment, the driving support ECU 10 cooperates with other ECU to perform lane change support control of the vehicle 102, as will be described further below.

A camera sensor 12, a radar sensor 14, and a setting operation device 16 are connected to the driving support ECU 10. The camera sensor 12 and radar sensor 14 each include a plurality of camera devices and a plurality of radar devices. The camera sensor 12 and the radar sensor 14 function as an object target information acquiring device 18 that acquires object target information around the vehicle 102.

Each camera device of the camera sensor 12 includes a camera unit that captures an image of the surroundings of the vehicle 102, and a recognition unit that analyzes image data obtained by capturing an image by the camera unit and recognizes a target such as a white line of a road or another vehicle, although not shown in the drawing. The recognition unit supplies information about the recognized target to the driving support ECU 10 at predetermined intervals.

Each radar device of the radar sensor 14 includes a radar transceiver and a signal processor (not shown). The radar transmitting/receiving unit emits a radio wave (hereinafter, referred to as "millimeter wave") in a millimeter wave band, and receives a millimeter wave (that is, a reflected wave)

reflected by a three-dimensional object (for example, another vehicle, a bicycle, or the like) existing in a radiation range. The signal processor supplies information indicating a distance between the own vehicle and the three-dimensional object, a relative speed between the own vehicle and the three-dimensional object, a relative position (direction) of the three-dimensional object with respect to the own vehicle, and the like to the driving support ECU 10 at predetermined time intervals on the basis of a phase difference between the transmitted millimeter wave and the received reflected wave, an attenuation level of the reflected wave, a time period from the transmission of the millimeter wave to the reception of the reflected wave, and the like. Incidentally, in lieu of the radar sensor 14, or in addition to the radar sensor 14, light detection and ranging (LiDAR) may be used.

The setting operation device 16 is provided at a position that can be operated by a driver, such as a steering wheel (not shown in FIG. 1), and is operated by the driver. Although not shown in FIG. 1, the setting operation device 16 includes a lane change support switch. As described later, the driving support ECU 10 starts the lane change support control when the lane change support switch is on and a predetermined condition to be described later is satisfied.

A drive device 22 that accelerates the vehicle 102 by applying a driving force to the driving wheels 24 is connected to the drive ECU 20. The drive ECU 20 normally controls the drive device 22 such that a driving force generated by the drive device 22 changes in accordance with a driving operation by the driver, and controls the drive device 22 based on a command signal when the drive ECU 20 receives the command signal from the driving support ECU 10.

A braking device 32 is connected to the braking ECU 30 to decelerate the vehicle 102 by braking by applying a braking force to the wheels 34. The braking ECU 30 controls the braking device so that the braking force generated by the braking device 32 changes in response to a braking operation by the driver in a normal state. Upon receiving the command signal from the driving support ECU 10, the braking ECU 30 performs the automated braking by controlling the braking device 32 based on the command signal. When the braking force is applied to the wheels, a brake lamp (not shown in FIG. 1) is lit.

An EPS device 42 is connected to the EPS. ECU 40. EPS. ECU 40 controls the steering assist torque by controlling EPS device 42 in a manner known in the art on the basis of the steering torque Ts and the vehicle speed Vo detected by the driving operation sensor 60 and the vehicle condition sensor 70, which will be described later, to reduce the steering burden on the driver. EPS. ECU 40 can steer the steered wheels 44 as needed by controlling EPS device 42. Therefore, EPS. ECU 40 and EPS device 42 function as an automatic steering device that automatically steers steered wheels as needed.

As can be seen from the above explanation, the drive ECU 20, the drive device 22, the braking ECU 30, the braking device 32, EPS. ECU 40, and EPS device 42 function as a travel control device 90 that controls travel of the vehicle 102 such as braking and turning.

The meter ECU 50 is connected with a touch panel type display device 52 that displays a state of control by the driving support ECU 10 and the like. The display device 52 may be, for example, a multi-information display in which meters and various types of information are displayed, or may be a display of the navigation device 80 described later. As will be described later, when receiving a signal from the driving support ECU 10, the display device 52 displays the status of the lane change support control.

The driving operation sensor 60 and the vehicle condition sensor 70 are connected to the CAN 104. Information detected by the driving operation sensor 60 and the vehicle condition sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a driving operation amount sensor for detecting an operation amount of the accelerator pedal, a braking operation amount sensor for detecting a pedaling force with respect to the master cylinder pressure or the brake pedal, and the like. Further, the driving operation sensor 60 includes a steering angle sensor that detects the steering angle θ, a steering torque sensor that detects the steering torque Ts, and the like. Further, the driving operation sensor 60 includes a turn lever that is operated when the driver desires to change the lane, and a mode switch that switches the traveling mode of the vehicle 102 between the sport mode and the comfort mode. Note that the sport mode is a mode in which the steering responsiveness of the vehicle is more important than the ride comfort, and the comfort mode is a mode in which the ride comfort is more important than the steering responsiveness of the vehicle.

The vehicle condition sensor 70 includes a vehicle speed sensor that detects the vehicle speed Vo of the vehicle 102, a longitudinal acceleration sensor that detects the acceleration in the longitudinal direction of the vehicle, a lateral acceleration sensor that detects the acceleration in the lateral direction of the vehicle, a yaw rate sensor that detects the yaw rate of the vehicle, and the like.

Further, a navigation device 80 is also connected to CAN 104. The navigation device 80 includes a global positioning system (GPS) receiver that detects the position of the vehicle 102, a storage device that stores map information and road information, and a communication device that acquires the latest information of the map information and the road information from the outside. The navigation device 80 functions as a device for acquiring information about the current position of the vehicle 102, and outputs a signal indicating the current position of the vehicle on the map to the driving support ECU 10. Further, when the destination is input, the navigation device 80 determines a target route from the current location of the vehicle 102 to the destination, and guides the vehicle to travel along the target route. In particular, when there is a branch point in front of the vehicle and a lane change is required in front of the branch point in order for the vehicle to travel along the target route, the navigation device 80 displays on the display device 52 that the lane change is required, and notifies the driver of the necessity of the lane change and notifies the driving support ECU 10.

Figure 2:
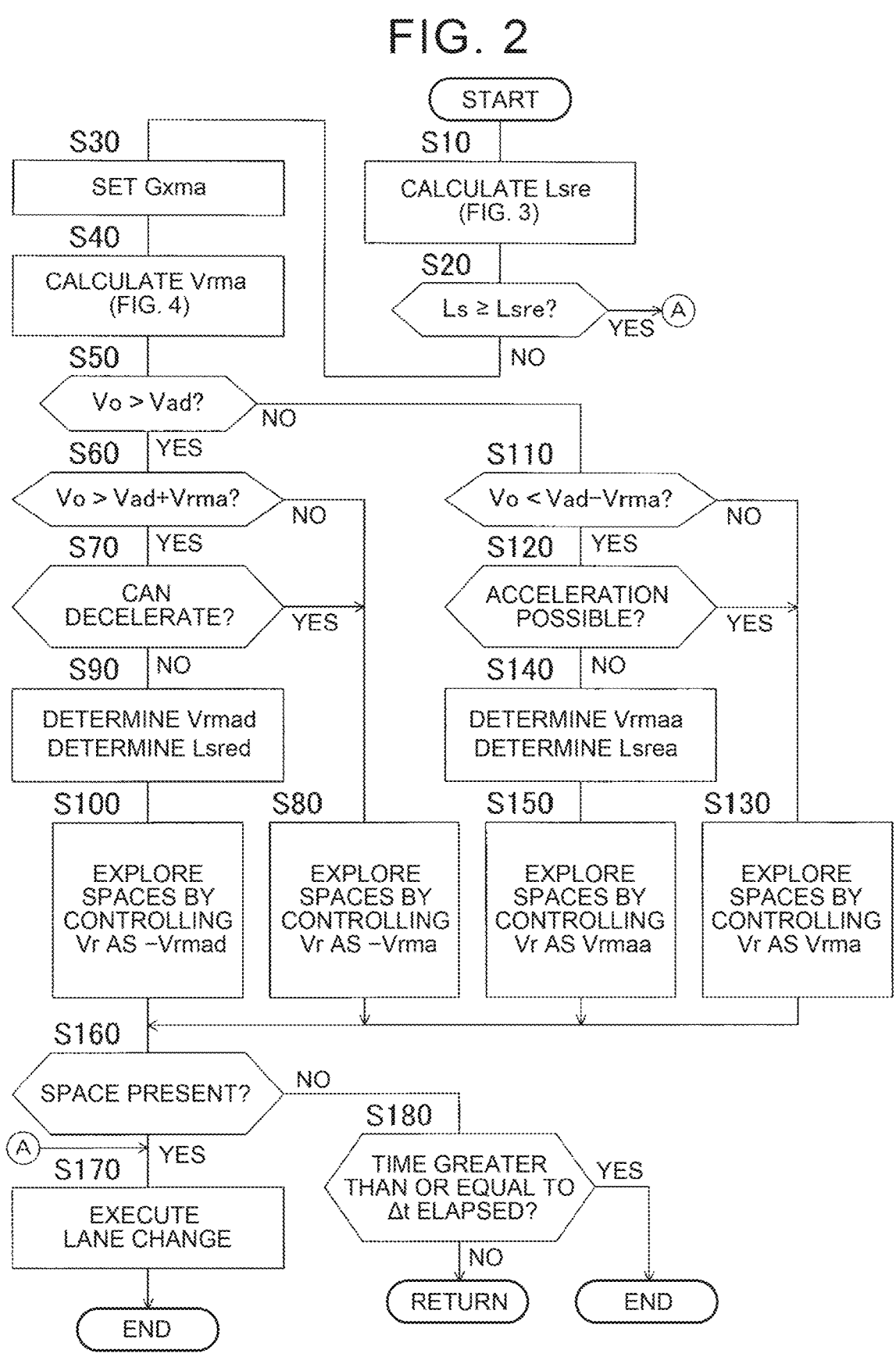
FIG. 2 is a flowchart corresponding to the lane change support control program in the embodiment.

In the embodiment, ROM of the driving support ECU 10 stores a lane change support control program corresponding to the flow chart shown in FIG. 2. CPU of the driving support ECU 10 performs lane change support by executing lane change support control according to the program.

Lane Change Support Control

Next, the lane change support control program according to the embodiment will be described with reference to the flowchart shown in FIG. 2. The lane change support control according to the flow chart shown in FIG. 2 is started by CPU of the driving support ECU 10 when the lane change support switch is on, when the turn lever is operated, or when a signal indicating that a lane change is required is inputted from the navigation device 80, and is repeatedly executed at predetermined intervals.

Figure 3:
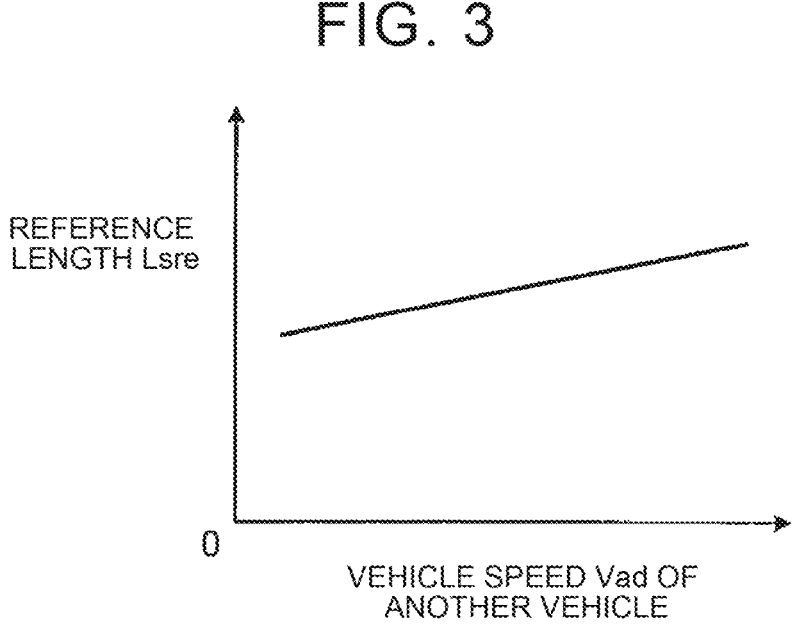
FIG. 3 is a diagram illustrating a map for calculating a reference length Lsre as a minimum length of a space in a lane of a lane change destination required for the own vehicle to change lanes based on the vehicle speed Vad of another vehicle of the lane change destination.

First, in S10, CPU estimates the vehicle speed Vad of the other vehicle based on the change in the positional relation between the other vehicle of the lane change destination and the own vehicle 102 acquired by the object target information acquiring device 18 and the vehicle speed Vo of the own vehicle. Further, CPU calculates the reference length Lsre as the minimum length of the space in the lane of the lane change destination required for the own vehicle to change the lane from the map shown in FIG. 3 based on the vehicle speed Vad of the other vehicle. As illustrated in FIG. 3, the reference length Lsre is calculated to be larger as the vehicle speed Vad of the other vehicle is larger.

For example, FIGS. 5A and 5B and FIGS. 6A and 6B show a situation in which the own vehicle changes the lane between the preceding vehicle and the succeeding vehicle when the preceding vehicle 112 and the succeeding vehicle 114 traveling in the lane 110 of the lane change destination are slower and faster than the own vehicle 102, respectively. In particular, FIGS. 5A and 6A indicate a situation before lane change, and FIGS. 5B and 6B indicate a situation after lane change.

If there is a large space in the lane of the lane change destination, a space search is not necessary. However, when the space in the lane of the lane change destination is small, a search for the space is required, and when the lane change is completed, the lane change is considered so as to secure the smallest inter-vehicle distance Lmin between the own vehicle 102 and the preceding vehicle 112 and the succeeding vehicle 114, respectively.

Figures 5A, 5B, 6A, 6B:
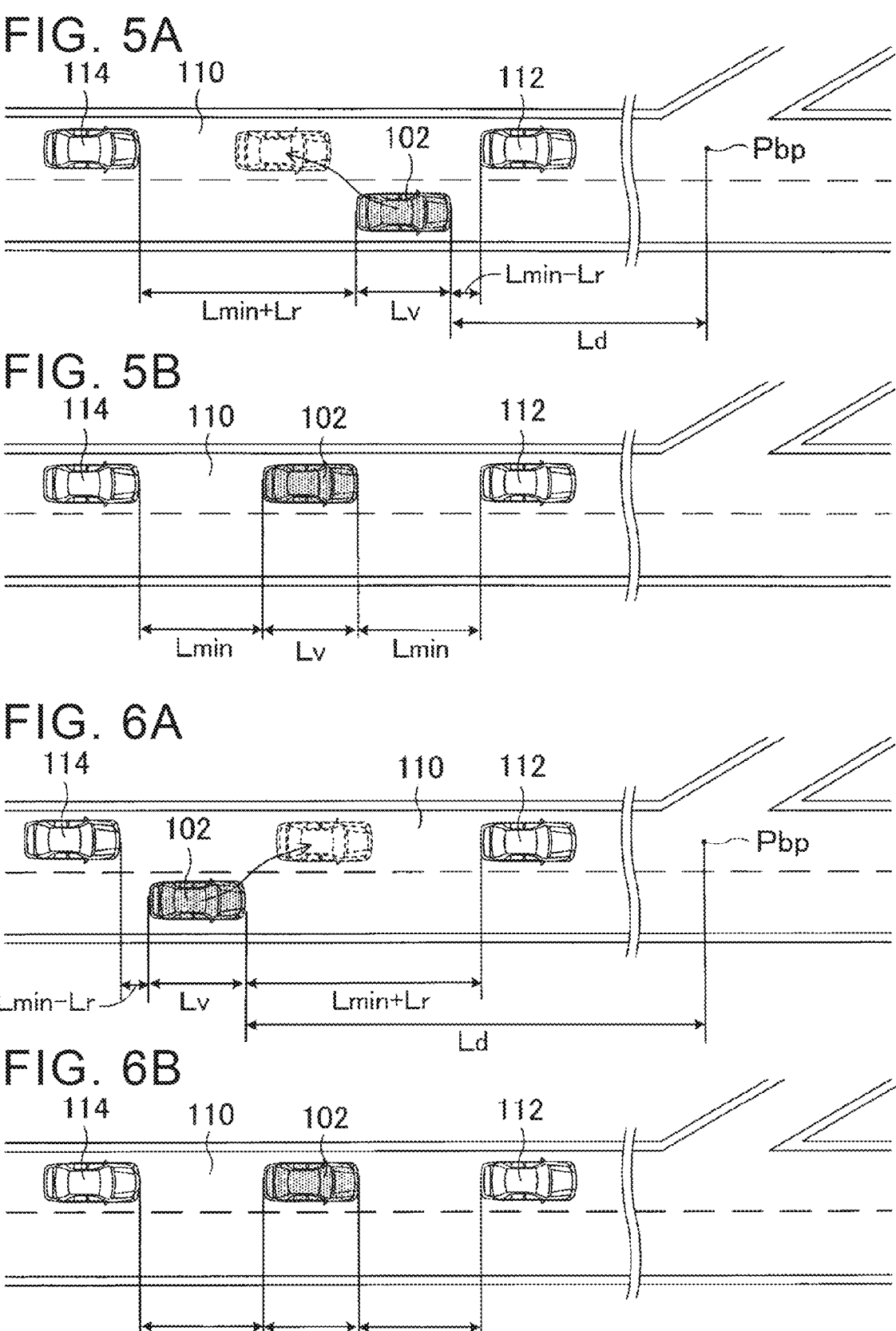
FIG. 5A is a diagram showing a state in which the own vehicle changes the lane between the preceding vehicle and the succeeding vehicle when the preceding vehicle traveling in the lane of the lane change destination is slower than the own vehicle.
FIG. 5B is a diagram illustrating a situation where the own vehicle changes lanes between the preceding vehicle and the succeeding vehicle for the case in which the preceding vehicle traveling in the lane of the lane change destination is slower than the own vehicle.
FIG. 6A is a diagram showing a situation in which the own vehicle changes lanes between the preceding vehicle and the succeeding vehicle when the succeeding vehicle traveling in the lane of the lane change destination is faster than the own vehicle.
FIG. 6B is a diagram illustrating a situation in which the own vehicle changes the lane between the preceding vehicle and the succeeding vehicle when the succeeding vehicle traveling in the lane of the lane change destination is faster than the own vehicle.

As can be seen from FIGS. 5B and 6B, when the length of the own vehicle 102 is Lv, the lane cannot be changed unless there is a space equal to or larger than 2Lmin+Lv in the lane of the lane change destination. Thus, the reference length Lsre may be 2Lmin+Lv. As illustrated in FIG. 3, the reference length Lsre is calculated to be larger as the vehicle speed Vad of the other vehicle is larger. When the preceding vehicle 112 and the succeeding vehicle 114 are located in the lane 110 of the lane change destination and the vehicle speeds thereof are different, the vehicle speed Vad may be the mean of the vehicle speeds of the two vehicles.

In S20, CPU estimates the length Ls of the space in the lane of the lane change destination in the area where the own vehicle 102 is likely to be able to change the lane, based on the lane change destination information acquired by the object target information acquiring device 18. Further, CPU determines whether the length Ls of the space is greater than or equal to the reference length Lsre, that is, whether the lane can be changed without searching for the space. CPU advances the present control to S170 when an affirmative determination is made, and advances the present control to S30 when a negative determination is made.

In S30, CPU sets the magnitude Gxma of the allowable acceleration or deceleration of the own vehicle, that is, the maximal magnitude of the forward/backward acceleration and deceleration allowable to the own vehicle based on the traveling state of the own vehicle. In the embodiment, the traveling state of the own vehicle is at least one of distance Ld from the current position of the own vehicle 102 to the branch point Pbp (see FIGS. 5A and 6A), the traveling mode of the own vehicle, and the type of lane change requirement. The magnitude Gxma of the allowable acceleration or deceleration is set to a larger value as the distance Ld is smaller, and is set to a larger value when the traveling mode is the sporting mode than when the traveling mode is the comfort mode. Further, the magnitude Gxma of the allowable acceleration or deceleration is set to be larger than when the lane change request is a request of the driver (turn lever operation) than when the lane change request is a request (control request) of the navigation device 80.

Figure 4:
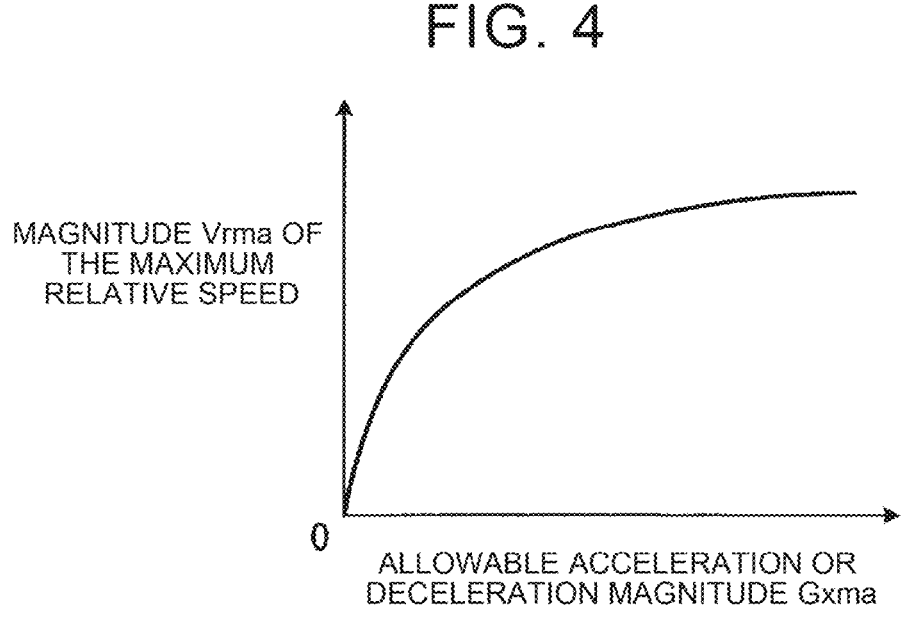
FIG. 4 is a diagram illustrating a map for calculating a magnitude Vrma of a maximum relative speed when searching for a lane change destination on the basis of a magnitude Gxma of an allowable acceleration or deceleration.

In S40, CPU calculates, based on the magnitude Gxma of the allowable acceleration or deceleration, the magnitude Vrma of the maximum relative speed at the time of searching for the lane change destination from the map shown in FIG. 4. The magnitude Vrma of the maximum relative speed is the maximum of the magnitude of the relative speed Vr (=Vo–Vad) of the own vehicle 102 with respect to the other vehicle at the lane change destination.

Next, the reason that the relationship between the magnitude Gxma of the allowable acceleration or deceleration and the magnitude Vrma of the maximum relative speed becomes the relationship illustrated in FIG. 4 will be described.

With the acceleration and deceleration of the own vehicle 102 as a Gxo, in the situations illustrated in FIGS. 4 and 5A, the distance Lr at which the own vehicle is relatively displaced with respect to the other vehicle by decelerating and accelerating the own vehicle, respectively, until the vehicle speed Vo of the own vehicle becomes the vehicle speed Vad of the other vehicle is expressed by Equation (1) below.

$$Lr = Vr * Vr/(2 * Gxo) \tag{1}$$

In the situation shown in FIG. 5A and FIG. 5B, in order to make the inter-vehicle distance between the own vehicle 102 and the preceding vehicle 112 after the lane change equal to or greater than the minimum inter-vehicle distance Lmin, the deceleration of the own vehicle needs to be started in a situation where the inter-vehicle distance between the own vehicle 102 and the preceding vehicle 112 is equal to or greater than Lmin–Lr. Further, in order to make the inter-vehicle distance between the own vehicle 102 and the succeeding vehicle 114 after the lane change equal to or greater than the minimum inter-vehicle distance Lmin, the deceleration of the own vehicle needs to be started in a situation where the inter-vehicle distance between the own vehicle 102 and the succeeding vehicle 114 is equal to or greater than Lmin+Lr.

Further, when the lane change is started in a situation where the own vehicle is traveling ahead of the preceding vehicle of the lane change destination, the inter-vehicle distance between the own vehicle and the preceding vehicle after the lane change may become too small. Therefore, in order to set the inter-vehicle distance between the own vehicle and the preceding vehicle after the lane change to the smallest inter-vehicle distance Lmin, the inter-vehicle distance between the own vehicle and the preceding vehicle at the time of starting the lane change needs to be equal to or greater than Lfront. Lfront may be smaller as the relative speed Vr increases, and may be zero when the own vehicle starts moving due to lane change.

When Lmin–Lr is smaller than Lfront, the inter-vehicle distance between the own vehicle and the preceding vehicle at the time of starting the lane change becomes Lfront. The inter-vehicle distance between the own vehicle and the preceding vehicle after the completion of the lane change becomes Lfront+Lr and larger than Lmin. Therefore, the lane of the own vehicle cannot be changed to a space having a 2Lmin+Lv length.

In order for the own vehicle to change lane to a 2Lmin+Lv length space, Lfront must be greater than or equal to Lmin−Lr. When Lfront is equal to Lmin−Lr, the following equation (2) is satisfied from the above equation (1), and thus the relative speed Vr is expressed by the following equation (3).

$$Lfront = Lmin - Lr = Lmin - Vr * Vr/(2 * Gxo) \qquad (2)$$

$$Vr = \{(Lmin - Lfront) * 2 * Gxo\}^{1/2} \qquad (3)$$

In the situation shown in FIGS. 6A and 6B, in order to make the inter-vehicle distance between the own vehicle 102 and the preceding vehicle 112 after the lane change equal to or greater than the minimum inter-vehicle distance Lmin, the acceleration of the own vehicle needs to be started in a situation where the inter-vehicle distance between the own vehicle 102 and the preceding vehicle 112 is equal to or greater than Lmin+Lr. Further, in order to make the inter-vehicle distance between the own vehicle 102 and the succeeding vehicle 114 after the lane change equal to or larger than the minimum inter-vehicle distance Lmin, the acceleration of the own vehicle needs to be started in a situation where the inter-vehicle distance between the own vehicle 102 and the succeeding vehicle 114 is equal to or larger than Lmin−Lr.

Further, when the lane change is started in a situation where the own vehicle is traveling behind the succeeding vehicle at the lane change destination, the inter-vehicle distance between the own vehicle and the succeeding vehicle after the lane change may become too small. Therefore, in order to set the inter-vehicle distance between the own vehicle and the succeeding vehicle after the lane change to the smallest inter-vehicle distance Lmin, the inter-vehicle distance between the own vehicle and the succeeding vehicle at the time of starting the lane change needs to be equal to or greater than Lrear. Lrear may be smaller as the relative speed Vr increases, and may be zero when the own vehicle starts moving due to lane change.

When Lmin−Lr is smaller than Lrear, the inter-vehicle distance between the own vehicle and the succeeding vehicle at the time of starting the lane change becomes Lrear. The inter-vehicle distance between the own vehicle and the succeeding vehicle after the completion of the lane change becomes Lrear+Lr and larger than Lmin. Therefore, the lane of the own vehicle cannot be changed to a space having a 2Lmin+Lv length.

In order for the own vehicle to change lane to a 2Lmin+Lv length space, Lrear must be greater than or equal to Lmin−Lr. Assuming that Lrear is equal to Lmin−Lr, the following equation (4) is satisfied from the above equation (1), and thus the relative speed Vr is expressed by the following equation (5).

$$Lrear = Lmin - Lr = Lmin - Vr * Vr/(2 * Gxo) \qquad (4)$$

$$Vr = \{(Lmin - Lrear) * 2 * Gxo\}^{1/2} \qquad (5)$$

In the above equations (3) and (5), considering that Lfront and Lrear are set to zero, and Lfront and Lrear must be equal to or greater than Lmin−Lr, the following equation (6) holds.

Therefore, the relationship between the magnitude Gxma of the allowable acceleration or deceleration and the magnitude Vrma of the maximum relative speed is the relationship shown in FIG. 4.

$$Vr = (Lmin * 2 * Gxo)^{1/2} \qquad (6)$$

In S50, CPU determines whether the vehicle speed Vo of the own vehicle 102 is larger than the vehicle speed Vad of the other vehicle of the lane change destination, that is, whether the own vehicle is faster than the other vehicle of the lane change destination. CPU advances the present control to S110 when a negative determination is made, and advances the present control to S60 when an affirmative determination is made.

In S60, CPU determines whether the vehicle speed Vo of the own vehicle 102 is larger than the sum Vad+Vrma of the vehicle speed Vad of the other vehicle of the lane change destination and the magnitude Vrma of the maximum relative speed. That is, CPU determines whether the relative speed Vr (=Vo−Vad) of the own vehicle 102 with respect to the other vehicle is larger than the magnitude Vrma of the maximum relative speed. CPU advances the present control to S80 when a negative determination is made, and advances the present control to S70 when an affirmative determination is made.

In S70, CPU determines whether the own vehicle 102 can be decelerated. CPU advances the present control to S90 when a negative determination is made, and advances the present control to S80 when an affirmative determination is made. When the inter-vehicle distance between the own vehicle and the succeeding vehicle in the same lane is equal to or smaller than the reference inter-vehicle distance of the deceleration determination, it may be determined that the own vehicle cannot be decelerated. In this case, the reference inter-vehicle distance of the deceleration determination may be a positive constant, but may be variably set to be larger as the relative vehicle speed of the succeeding vehicle with respect to the own vehicle is higher.

In S80, CPU outputs a command signal to the travel control device 90 so that the relative speed Vr of the own vehicle 102 with respect to the other vehicle of the lane change destination becomes−Vrma. Further, CPU searches for a space having a length equal to or larger than the reference length Lsre in the lane of the lane change destination while controlling the vehicle speed of the own vehicle.

In S90, CPU determines the magnitude Vrmad of the realizable relative speed of the own vehicle with respect to the other vehicle of the lane change destination based on the inter-vehicle distance between the own vehicle 102 and the succeeding vehicle of the lane change destination and the relative vehicle speed of the succeeding vehicle of the lane change destination with respect to the own vehicle. The magnitude Vrmad of the relative speed is smaller than the magnitude Vrma of the maximum relative speed. In addition, CPU determines a correction reference length Lsred as a correction minimum length of a space in a lane of a lane change destination required for the own vehicle to change lanes, based on the magnitude Vrmad of the relative speed. The modified reference length Lsred is then determined such that the greater the magnitude Vrmad of the relative speed, the greater.

In S100, CPU outputs a command signal to the travel control device 90 so that the relative speed Vr of the own vehicle 102 with respect to the other vehicle of the lane change destination becomes −Vrmad. Further, CPU searches for a space having a length equal to or larger than the correction reference length Lsred in the lane of the lane change destination while controlling the vehicle speed of the own vehicle.

In S110, CPU determines whether the vehicle speed Vo of the own vehicle 102 is smaller than the difference Vad−Vrma between the vehicle speed Vad of the other vehicle at the lane change destination and the magnitude Vrma of the maximum relative speed. That is, CPU determines whether the relative speed Vr (=Vo−Vad) of the own vehicle 102 with respect to the other vehicle is smaller than the sign inversion −Vrma of the magnitude Vrma of the maximum relative speed. CPU advances the present control to S130 when a negative determination is made, and advances the present control to S120 when an affirmative determination is made.

In S120, CPU determines whether the own vehicle 102 can be accelerated. CPU advances the present control to S140 when a negative determination is made, and advances the present control to S130 when an affirmative determination is made. When the inter-vehicle distance between the own vehicle and the preceding vehicle in the same lane is equal to or smaller than the reference inter-vehicle distance for acceleration determination, it may be determined that the own vehicle cannot be accelerated. In this case, the reference inter-vehicle distance of the acceleration determination may be a positive constant, but may be variably set so as to be smaller as the relative vehicle speed of the preceding vehicle with respect to the own vehicle is higher.

In S130, CPU outputs a command signal to the travel control device 90 so that the relative speed Vr of the own vehicle 102 with respect to the other vehicle of the lane change destination becomes Vrma. Further, CPU searches for a space having a length equal to or larger than the reference length Lsre in the lane of the lane change destination while controlling the vehicle speed of the own vehicle.

In S140, CPU determines the magnitude Vrmaa of the realizable relative speed of the own vehicle with respect to the other vehicle of the lane change destination based on the inter-vehicle distance between the own vehicle 102 and the preceding vehicle of the lane change destination and the relative vehicle speed of the preceding vehicle of the lane change destination with respect to the own vehicle. The magnitude Vrmaa of the relative speed is smaller than the magnitude Vrma of the maximum relative speed. In addition, CPU determines a correction reference length Lsrea as a correction minimum length of a space in a lane of a lane change destination required for the own vehicle to change lanes, based on the magnitude Vrmaa of the relative speed. The modified reference length Lsrea is then determined such that the greater the magnitude Vrmaa of the relative speed, the greater.

In S150, CPU outputs a command signal to the travel control device 90 so that the relative speed Vr of the own vehicle 102 with respect to the other vehicle of the lane change destination becomes Vrmaa. Further, CPU searches for a space having a length equal to or larger than the correction reference length Lsrea in the lane of the lane change destination while controlling the vehicle speed of the own vehicle.

In S160, CPU determines whether the search in S80, S100, S130 or S150 has determined that there is enough space to meet the respective length requirement. CPU advances the present control to S180 when a negative determination is made, and advances the present control to S170 when an affirmative determination is made.

In S170, CPU executes lane change of the own vehicle to the lane of the lane change destination by outputting a command signal to the travel control device 90 so that the own vehicle 102 moves to a space satisfying the length requirement by autonomous driving. The lane change by the autonomous driving may be performed in any manner known in the art.

In S180, CPU determines whether a time equal to or more than the reference time Δt (positive constant) has elapsed since the present control was started. When a negative determination is made, CPU temporarily ends the present control and returns the present control to S10. When an affirmative determination is made, CPU ends the present control without executing the lane change of the own vehicle, outputs a command signal to the meter ECU 50, and displays the end of the present control on the display device 52.

As can be seen from the above explanation, according to the embodiment, the reference length Lsre as the minimum length of the space in the lane of the lane change destination required for the own vehicle to change the lane is calculated so as to be larger as the vehicle speed Vad of the other vehicle of the lane change destination is larger (S10). The length Ls of the space in the lane of the lane change destination is estimated in an area where the own vehicle 102 may change the lane. By determining whether the length Ls of the space is equal to or larger than the reference length Lsre, it is determined whether the lane can be changed without searching for the space (S20).

When the length Ls of the space is less than the reference length Lsre, the magnitude Gxma of the allowable acceleration or deceleration of the own vehicle, that is, the maximal magnitude of the longitudinal acceleration and deceleration allowable to the own vehicle is set based on the traveling state of the own vehicle (S30). Further, based on the magnitude Gxma of the allowable acceleration or deceleration, the magnitude Vrma of the maximum relative speed at the time of searching for the lane change destination space is calculated from the map shown in FIG. 4 (S40).

Further, the travel control device 90 is controlled so that the relative speed of the own vehicle with respect to the other vehicle becomes the target relative speed, and the vehicle is accelerated or decelerated, and a space equal to or longer than the minimum length in the lane of the lane change destination is searched (S80, S130).

The magnitude Gxma of the allowable acceleration or deceleration is set to be larger as the distance Ld from the current position of the own vehicle 102 to the branch point Pbp is smaller. The magnitude Gxma of the allowable acceleration or deceleration is set to be larger when the traveling mode is the sporting mode than when the traveling mode is the comfort mode. Further, the magnitude Gxma of the allowable acceleration or deceleration is set to be larger than when the lane change request is a request of the driver (turn lever operation) than when the lane change request is a request of the navigation device 80 (vehicle travel control request).

Therefore, it is possible to control the vehicle speed Vo of the own vehicle in such a manner that the relative speed Vr (=Vo−Vad) of the own vehicle with respect to the other vehicle traveling in the lane of the lane change destination becomes the target relative speed Vrma calculated in accordance with the traveling state of the own vehicle such as the distance Ld from the current position of the own vehicle to the branching point. Therefore, as compared with the case where the own vehicle is accelerated or decelerated in accordance with only the speed of the other vehicle regardless of the traveling state of the own vehicle, and the space is searched for, it is possible to preferably search for the space in the lane of the lane change destination necessary for the own vehicle to make a lane change.

In particular, when the vehicle speed Vo of the own vehicle 102 is larger than the vehicle speed Vad of the other vehicle of the lane change destination (S50) and the vehicle speed of the own vehicle is equal to or smaller than the sum (Vrma+Vrma) of the vehicle speed of the other vehicle and the target relative speed (S60), the travel control device 90 is controlled in such a manner that the relative speed of the own vehicle with respect to the other vehicle becomes the target relative speed, and the vehicle speed of the own vehicle is controlled, and a space equal to or larger than the minimum length Lsre in the lane of the lane change destination is searched (S80). Therefore, it is possible to search for a space having a minimum length or more while controlling the vehicle speed of the own vehicle in such a manner that the relative speed becomes the target relative speed.

On the other hand, when the vehicle speed Vo of the own vehicle 102 is larger than the vehicle speed Vad of the other vehicle (S50), the vehicle speed of the own vehicle is larger than the sum of the vehicle speed of the other vehicle and the target relative speed (S60), and the deceleration of the own vehicle is impossible (S70), the realizable relative speed Vrmad of the own vehicle with respect to the other vehicle is determined (S90). In addition, a correction minimum length Lsred of a lane-changeable space of the own vehicle is determined based on the realizable relative speed (S90). Further, the travel control device is controlled in such a manner that the relative speed of the own vehicle with respect to the other vehicle becomes a realizable target relative speed (–Vrmad), and the vehicle speed of the own vehicle is controlled, and a space equal to or larger than the correction minimum length Lsred in the lane of the lane change destination is searched. Therefore, it is possible to search for a space equal to or larger than the correction minimum length while controlling the vehicle speed of the own vehicle in such a manner that the relative speed becomes a realizable target relative speed.

Further, when the vehicle speed Vo of the own vehicle 102 is equal to or lower than the vehicle speed Vad of the other vehicle (S50) and the vehicle speed of the own vehicle is equal to or larger than the difference (Vad–Vrma) between the vehicle speed of the other vehicle and the target relative speed (S110), the travel control device 90 is controlled in such a manner that the relative speed of the own vehicle with respect to the other vehicle becomes the target relative speed to control the vehicle speed of the own vehicle, and a space equal to or larger than the minimum length Lsre in the lane of the lane change destination is searched (S130). Therefore, it is possible to search for a space having a minimum length or more while controlling the vehicle speed of the own vehicle in such a manner that the relative speed becomes the target relative speed.

On the other hand, when the vehicle speed Vo of the own vehicle 102 is equal to or lower than the vehicle speed Vad of the other vehicle (S50), but the vehicle speed of the own vehicle is less than the difference (Vad–Vrma) between the vehicle speed of the other vehicle and the target relative speed (S110), and acceleration of the own vehicle is impossible (S120), the realizable relative speed Vrmaa of the own vehicle with respect to the other vehicle is determined (S140). In addition, when the vehicle speed Vo of the own vehicle 102 is equal to or lower than the vehicle speed Vad of the other vehicle (S50), but the vehicle speed of the own vehicle is less than the difference (Vad–Vrma) between the vehicle speed of the other vehicle and the target relative speed (S110), and acceleration of the own vehicle is impossible (S120), the correction minimum length Lsrea of the space in which the own vehicle can change the lane is determined based on the realizable relative speed (S140). Further, the travel control device is controlled in such a manner that the relative speed of the own vehicle with respect to the other vehicle becomes a realizable target relative speed Vrmaa, and the vehicle speed of the own vehicle is controlled, and a space equal to or larger than the correction minimum length Lsrea in the lane of the lane change destination is searched for (S150). Therefore, it is possible to search for a space equal to or larger than the correction minimum length while controlling the vehicle speed of the own vehicle in such a manner that the relative speed becomes a realizable target relative speed.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, in S10, the reference length Lsre is calculated to be larger as the vehicle speed Vad of the other vehicle at the lane change destination is larger. However, the reference length Lsre may be constant.

Further, in the above-described embodiment, in S30, the magnitude Gxma of the allowable acceleration or deceleration of the own vehicle is set based on the traveling state of the own vehicle. The traveling state of the own vehicle is distance Ld between the present location of the own vehicle 102 and the branching point, the traveling mode of the own vehicle, and the type of lane change requirement. However, any one of the distance Ld, the traveling mode of the own vehicle, and the type of lane change request may be omitted.

Further, in the above-described embodiment, it is determined whether the own vehicle 102 can be decelerated and accelerated in S70 and S120, respectively. However, these steps may be omitted.

What is claimed is:

1. A lane change support device comprising:

sensors configured to acquire information of an object target around an own vehicle, the sensors including a camera sensor and a radar sensor; and a processor configured to estimate an average vehicle speed of adjacent vehicles traveling in a target lane that is a destination of a lane change of the own vehicle based on the information acquired by the sensors, determine a reference length of a space between the adjacent vehicles in the target lane that is necessary for the own vehicle to make the lane change based on the estimated average vehicle speed using a first map, the first map indicating a relationship between the average vehicle speed of the adjacent vehicles and the reference length, estimate an actual length of the space between the adjacent vehicles in the target lane based on the information acquired by the sensors, determine whether the actual length is less than the reference length, set a magnitude of an allowable acceleration or deceleration of the own vehicle based on a traveling state of the own vehicle in a case where the actual length is less than the reference length, the traveling state including a distance from a current position of the own vehicle to a branch point on a road where the own vehicle is traveling, and the magnitude of the allowable acceleration or deceleration being increased as the distance from the current position of the own vehicle to the branch point decreases, calculate a magnitude of a target relative speed of the own vehicle with respect to the average vehicle speed of the adjacent vehicles based on the magnitude of the allowable acceleration or deceleration using a second map, the second map indicating a relationship between the magnitude of the target relative speed and the magnitude of the allowable acceleration or deceleration, search for a space in the target lane that is necessary for the own vehicle to make the lane change while controlling a vehicle speed of the own vehicle such that a relative speed of the own vehicle with respect to the average vehicle speed of the adjacent vehicles becomes the target relative speed, and output an instruction signal to autonomously drive the own vehicle into the space identified by the search.

2. The lane change support device according to claim 1, wherein the processor is further configured to determine whether the vehicle speed of the own vehicle is higher than the average vehicle speed of the adjacent vehicles, determine whether the vehicle speed of the own vehicle is equal to or lower than a sum of the average vehicle speed of the adjacent vehicles and the target relative speed in a case where the vehicle speed of the own vehicle is higher than the average vehicle speed of the adjacent vehicles, search for a space having a length equal to or larger than the reference length in the target lane while controlling the vehicle speed of the own vehicle such that the relative speed of the own vehicle with respect to the average vehicle speed of the adjacent vehicles becomes the target relative speed, in a case where the vehicle speed of the own vehicle is equal to or lower than the sum of the average vehicle speed of the adjacent vehicles and the target relative speed, and output the instruction signal to autonomously drive the own vehicle into the space identified by the search.

3. The lane change support device according to claim 1, wherein the processor is further configured to determine whether the vehicle speed of the own vehicle is higher than the average vehicle speed of the adjacent vehicles, determine whether the vehicle speed of the own vehicle is higher than a sum of the average vehicle speed of the adjacent vehicles and the target relative speed in a case where the vehicle speed of the own vehicle is higher than the average vehicle speed of the adjacent vehicles, determine a realizable relative speed of the own vehicle with respect to the average vehicle speed of the adjacent vehicles and determine a corrected reference length of a space in which the own vehicle is able to make the lane change based on the realizable relative speed, in a case where the vehicle speed of the own vehicle is higher than the sum of the average vehicle speed of the adjacent vehicles and the target relative speed, search for a space having a length equal to or larger than the corrected reference length in the target lane while controlling the vehicle speed of the own vehicle such that the relative speed of the own vehicle with respect to the average vehicle speed of the adjacent vehicles becomes the realizable relative speed, and output the instruction signal to autonomously drive the own vehicle into the space identified by the search.

4. The lane change support device according to claim 1, wherein the processor is further configured to determine whether the vehicle speed of the own vehicle is equal to or lower than the average vehicle speed of the adjacent vehicles, determine whether the vehicle speed of the own vehicle is equal to or higher than a difference between the average vehicle speed of the adjacent vehicles and the target relative speed in a case where the vehicle speed of the own vehicle is equal to or lower than the average vehicle speed of the adjacent vehicles, search for a space having a length equal to or larger than the reference length in the target lane while controlling the vehicle speed of the own vehicle such that the relative speed of the own vehicle with respect to the average vehicle speed of the adjacent vehicles becomes the target relative speed, in a case where the vehicle speed of the own vehicle is equal to or higher than the difference between the average vehicle speed of the adjacent vehicles and the target relative speed, and output the instruction signal to autonomously drive the own vehicle into the space identified by the search.

5. The lane change support device according to claim 1, wherein the processor is further configured to determine whether the vehicle speed of the own vehicle is equal to or lower than the average vehicle speed of the adjacent vehicles, determine whether the vehicle speed of the own vehicle is lower than a difference between the average vehicle speed of the adjacent vehicles and the target relative speed in a case where the vehicle speed of the own vehicle is equal to or lower than the average vehicle speed of the adjacent vehicles, determine a realizable relative speed of the own vehicle with respect to the average vehicle speed of the adjacent vehicles and determine a corrected reference length of a space in which the own vehicle is able to make the lane change based on the realizable relative speed, in a case where the vehicle speed of the own vehicle is lower than the difference between the average vehicle speed of the adjacent vehicles and the target relative speed, search for a space having a length equal to or larger than the corrected reference length in the target lane while controlling the vehicle speed of the own vehicle such that the relative speed of the own vehicle with respect to the average vehicle speed of the adjacent vehicles becomes the realizable relative speed, and output the instruction signal to autonomously drive the own vehicle into the space identified by the search.

6. The lane change support device according to claim 1, wherein the adjacent vehicles include a preceding vehicle and a following vehicle that are traveling in the target lane adjacent to a lane where the own vehicle is traveling.

7. The lane change support device according to claim 1, wherein the processor is further configured to control the own vehicle to perform the lane change without executing the search for the space in a case where the actual length is equal to or greater than the reference length.

8. The lane change support device according to claim 1, wherein the traveling state of the own vehicle further includes a traveling mode of the own vehicle, the traveling mode including a sport mode where steering responsiveness of the own vehicle is given priority over riding comfort and a comfort mode where riding comfort is given priority over the steering responsiveness, and the processor is further configured to increase the magnitude of the allowable acceleration or deceleration when the traveling mode is the sport mode compared to when the traveling mode is the comfort mode.

9. The lane change support device according to claim 1, wherein the traveling state of the own vehicle further includes an origination of a lane change request, the origination of the lane change request being either a manual request made by a driver of the own vehicle operating a turn signal lever or an autonomous request output by a navigation system installed in the own vehicle, and the processor is further configured to increase the magnitude of the allowable acceleration or deceleration when the lane change request is the manual request compared to when the lane change request is the autonomous request.

10. The lane change support device according to claim 1, wherein the first map indicates that the reference length increases as the average vehicle speed of the adjacent vehicles increases.

11. The lane change support device according to claim 1, wherein the second map indicates that the magnitude of the target relative speed increases as the magnitude of the allowable acceleration or deceleration increases.

\* \* \* \* \*